(12) United States Patent
Karakashian

(10) Patent No.: US 7,693,955 B2
(45) Date of Patent: Apr. 6, 2010

(54) SYSTEM AND METHOD FOR DEPLOYING A WEB SERVICE

(75) Inventor: Todd Karakashian, San Francisco, CA (US)

(73) Assignee: Bea Systems, Inc., Redwood Shores, CA (US)

(*) Notice: Subject to any disclaimer, the term of this patent is extended or adjusted under 35 U.S.C. 154(b) by 1097 days.

(21) Appl. No.: 10/366,246

(22) Filed: Feb. 13, 2003

(65) Prior Publication Data

US 2004/0045005 A1 Mar. 4, 2004

Related U.S. Application Data

(60) Provisional application No. 60/359,098, filed on Feb. 22, 2002, provisional application No. 60/359,231, filed on Feb. 22, 2002.

(51) Int. Cl.
*G06F 15/16* (2006.01)
*G06F 15/177* (2006.01)

(52) U.S. Cl. .......... 709/217; 709/203; 709/201; 709/220

(58) Field of Classification Search ......... 709/200, 709/220, 222, 201, 217, 203; 717/120
See application file for complete search history.

(56) References Cited

U.S. PATENT DOCUMENTS

| | | | |
|---|---|---|---|
| 6,104,868 A | | 8/2000 | Peters et al. |
| 6,457,066 B1* | | 9/2002 | Mein et al. ............. 719/330 |
| 6,792,605 B1* | | 9/2004 | Roberts et al. .......... 719/313 |
| 6,970,869 B1* | | 11/2005 | Slaughter et al. ........ 707/10 |
| 6,985,939 B2* | | 1/2006 | Fletcher et al. ......... 709/223 |
| 6,990,532 B2* | | 1/2006 | Day et al. ............... 709/245 |
| 7,000,238 B2* | | 2/2006 | Nadler et al. ........... 719/330 |
| 7,013,340 B1* | | 3/2006 | Burd et al. .............. 709/229 |
| 7,055,143 B2* | | 5/2006 | Ringseth et al. ......... 717/143 |
| 7,127,713 B2* | | 10/2006 | Davis et al. ............. 717/177 |
| 7,152,090 B2* | | 12/2006 | Amirisetty et al. ...... 709/200 |
| 7,240,125 B2* | | 7/2007 | Fleming ................. 709/246 |
| 7,289,964 B1 | | 1/2008 | Brittenham et al. |
| 7,325,047 B2 | | 1/2008 | Brittenham et al. |
| 7,340,714 B2* | | 3/2008 | Upton .................... 717/102 |
| 2002/0046294 A1* | | 4/2002 | Brodsky et al. .......... 709/246 |
| 2002/0071423 A1 | | 6/2002 | Mirashrafi et al. |
| 2002/0099738 A1* | | 7/2002 | Grant ..................... 707/513 |
| 2002/0152210 A1 | | 10/2002 | Johnson et al. |
| 2002/0178254 A1* | | 11/2002 | Brittenham et al. ...... 709/224 |
| 2003/0004746 A1* | | 1/2003 | Kheirolomoom et al. ... 705/1 |
| 2003/0005181 A1* | | 1/2003 | Bau et al. ............... 709/330 |
| 2003/0014733 A1* | | 1/2003 | Ringseth et al. ......... 717/116 |
| 2003/0033369 A1* | | 2/2003 | Bernhard ................ 709/203 |
| 2003/0105884 A1 | | 6/2003 | Upton |
| 2003/0110242 A1* | | 6/2003 | Brown et al. ............ 709/222 |
| 2003/0110270 A1* | | 6/2003 | Copp ..................... 709/228 |
| 2003/0110373 A1* | | 6/2003 | Champion ............... 713/153 |
| 2003/0118353 A1* | | 6/2003 | Baller et al. ............ 399/8 |
| 2003/0154239 A1* | | 8/2003 | Davis et al. ............. 709/201 |
| 2004/0267933 A1* | | 12/2004 | Przybylski et al. ....... 709/227 |
| 2006/0036448 A1* | | 2/2006 | Haynie et al. ........... 705/1 |

* cited by examiner

*Primary Examiner*—William C Vaughn, Jr.
*Assistant Examiner*—Kristie D Shingles
(74) *Attorney, Agent, or Firm*—Fliesler Meyer LLP

(57) ABSTRACT

A Web service can be deployed using a backend component such as an Enterprise JavaBean or Java class. The operation of the Web service can be mapped to methods of the backend component. An interceptor can provide access to SOAP contents of a Web service invocation message, passing contents to and from the backend component. The interceptor writes response data received from the backend component to a Web service response message, which can be sent to the client invoking the Web service. A codec, such as a serializer or deserializer, can be used to convert data in the Web service invocation message and invocation response message between XML representations and Java objects for use with the backend component.

21 Claims, 2 Drawing Sheets

SYSTEM AND METHOD FOR DEPLOYING A WEB SERVICE

CLAIM OF PRIORITY

This application claims priority to U.S. Provisional Patent Application No. 60/359,098, filed Feb. 22, 2002, entitled "WEB SERVICES RUNTIME ARCHITECTURE," as well as U.S. Provisional Patent Application No. 60/359,231, filed Feb. 22, 2002, entitled "WEB SERVICES PROGRAMMING AND DEPLOYMENT," each of which is hereby incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to the implementation of Web services.

BACKGROUND

Web services are becoming an integral part of many application servers, with an importance that can rival HTTP or RMI stacks. Java standards for Web Services are being developed through the Java Community Process. Presently, there is no complete and easy to use model for developing and deploying Web services. Further, when developing Web services, it is necessary for the developer to fully understand the complicated Web Service Definition Language (WSDL). The need to learn yet another complicated language is undesirable to many developers.

BRIEF SUMMARY

Systems and methods in accordance with one embodiment of the present invention can overcome deficiencies in present approaches to developing and deploying a Web service. A backend component such as an Enterprise JavaBean or Java class is used to implement a Web service. The operation of the Web service is mapped to methods of the backend component.

An interceptor provides access to SOAP contents of a Web service invocation message. The interceptor can read the Web service invocation message and pass the contents of the message to the backend component. The interceptor can receive response data back from the backend component and write SOAP contents to a Web service response message. This response message can be sent to the client invoking the Web service.

A codec, such as a serializer or deserializer, can be used to convert data in the Web service invocation message and invocation response message between XML representations and Java objects for use with the backend component. A JMS connection factory can be utilized for using JMS with the Web service. An autotype method can generate custom codecs for custom data conversion.

Other features, aspects, and objects of the invention can be obtained from a review of the specification, the figures, and the claims.

DETAILED DESCRIPTION

Systems and methods for deploying a Web service in accordance with one embodiment of the present invention follow an "export from Java" model. Using such a model, a Web service developer can create Java interfaces and components without needing to know the Web Service Definition Language (WSDL). An Web service runtime can be used to generate any WSDL description that might be needed by remote clients in order to access the Web service. This approach can be suitable to developers who may be familiar with Java and J2EE, but do not wish to immerse themselves in the complicated WSDL specification.

An Web service runtime in accordance with one embodiment of the present invention may not support an implementation of Web services that must conform to a fixed WSDL description, although other embodiments may support these implementations. A service developer understand WSDL, but such understanding is not required. Support for an "import from WSDL" model can also be supported. Tools, such as may be developed by third parties, can be used to introspect WSDL and generate a template "export from Java" implementation that closely conforms to the input WSDL.

Figure 1:
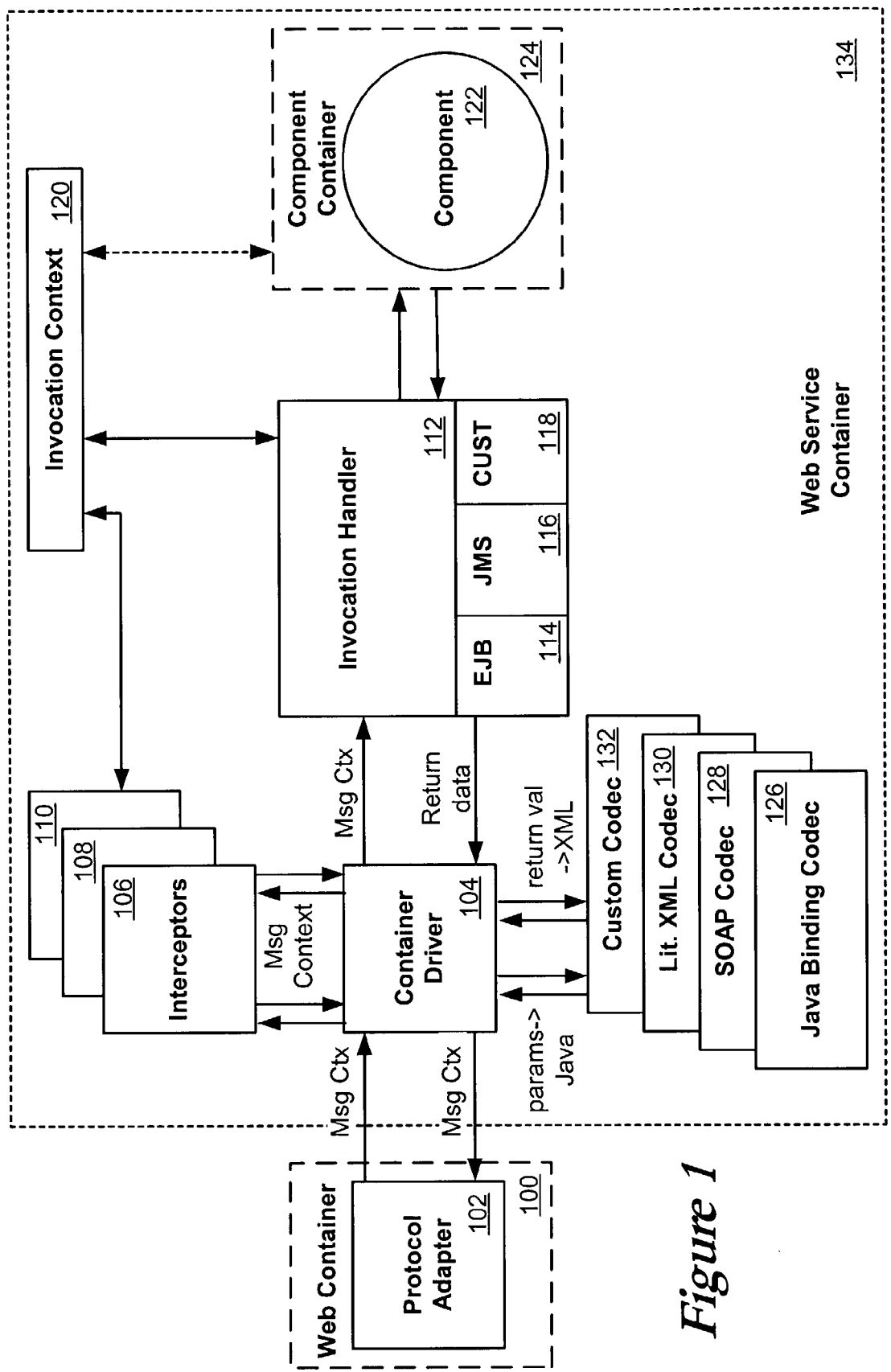
FIG. 1 is a diagram of a system in accordance with one embodiment of the present invention.

A Web service can be implemented using certain types of components. Some of these components are shown in FIG. 1, a diagram of a Web service container 134 that can be used to implement Web services. The HTTP protocol adapter 102 of the Web container 100 is shown passing message context to, and receiving message context from, a container driver 104. The container driver 104 receives the message context from the protocol adapter 102 and sends the message context to the registered inbound interceptors 106, 108, 110. After extracting the operation parameters and performing any necessary data binding, such as by using a Java Binding codec 126, a SOAP codec 128, an XML codec 130, or a custom codec 132, the container driver 104 submits the operation request to the appropriate invocation handler 112, such as for EJB 114 or JMS 116, or to a customized invocation handler 118. After receiving data back from the invocation handler 112, the container driver 104 can perform any data unbinding using the appropriate codecs 126, 128, 130, 132 and send the response to the outbound interceptors 106, 108, 110. The container driver 104 can then return the response to the protocol adapter 102. The protocol adapter, interceptors, and invocation handler can each have access to an invocation context object 120 The invocation handler 112 can also provide context access to the component 122 to which it delegates, which can be contained in a component container 124. Backend J2EE components such as Enterprise JavaBeans (EJBs) can be used as a component 122 for the invocation handler 112, as well as for interceptor components 106, 108, 110. A specific interceptor that can be used, referred to as a flow handler, can provide access to SOAP messages. The codecs 126, 128, 130, 132, also referred to as serializers or deserializers, can be used to convert data between XML representation and Java objects.

The operations of a Web service can be mapped to methods of these backend J2EE components. A single Web service can be implemented in terms of multiple backend components, with each operation being associated with a particular backend component.

Web service operation invocations can be sent that are encoded in SOAP messages. The parameters can be mapped between Java data types and XML using serializer and deserializer classes, or codecs. An Web service runtime can contain a set of hardwired codecs to support built-in data types in the SOAP specification. If non-built-in data types are needed, the runtime can require that codecs be provided by the application. An application can include tool support for generating codecs by introspecting the data types used in many types of EJBs. Such support can be implemented through an autotype method, and referred to as an Autotyper.

Sometimes an application may need access to the SOAP contents of an invocation message. In this case, a user can write an interceptor referred to as a "flow handler". Registered flow handlers can be called prior to, and immediately after, the invoke of a backend component. A flow handler implementation can receive access to the SOAP request and response, and can read or write accordingly. Multiple flow handlers can be chained together.

The developer of a Web service in accordance with one embodiment of the present invention can perform the following steps to build and deploy a Web service. Command-line tools can be provided. Ant tasks can facilitate the use of these tools. A master service generation task, such as "ServiceGen", can perform all these steps using one task.

Figure 2:
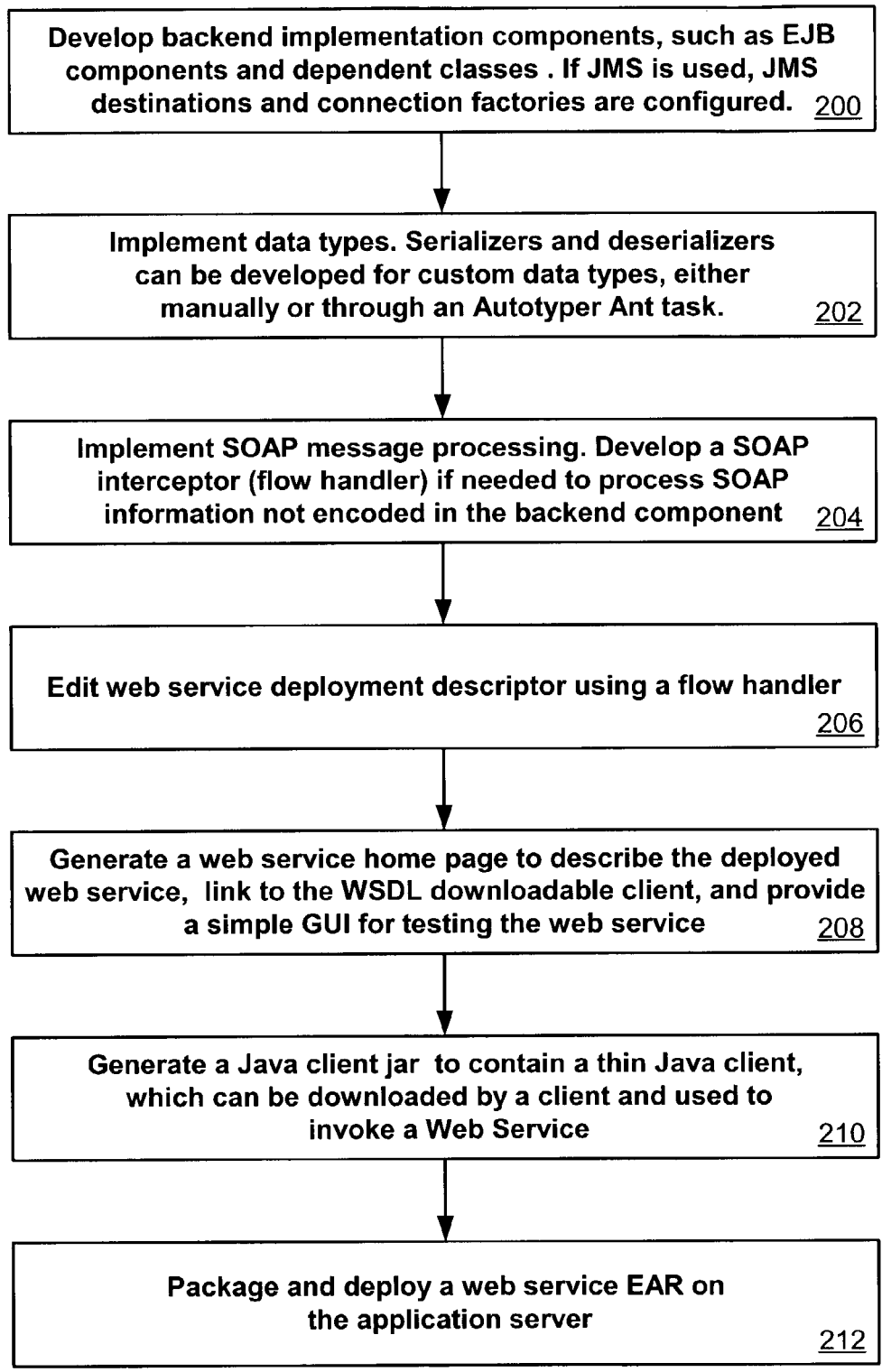
FIG. 2 is flowchart for a method that can be used with the system of FIG. 1.

A method that can be used to build and deploy a Web service in accordance with one embodiment of the present invention is shown in FIG. 2. The method includes first developing the backend implementation components 200. EJB components and their dependent classes can be packaged in ejb-jars. If JMS is used, JMS destinations and connection factories can be configured in a configuration file such as config.xml.

Data types can then be implemented, if necessary 202. If data types other than built-in data types are desired, serializers and deserializers can be developed for these custom types. This can be accomplished through an Autotyper Ant task, or can be done manually.

SOAP message processing can also be implemented 204. If an application needs to process information from SOAP headers in a request or response, or in other parts of the SOAP message not encoded into the backend component parameters, a SOAP interceptor called a flow handler can be developed. A Web service deployment descriptor can be edited using the flow handler 206.

A Web service home page can be generated that describes the deployed Web service, provides a link to the WSDL downloadable client, and provides a simple GUI for testing the Web service 208. This can be accomplished using a page generation Ant task.

A Java client jar can be generated to contain a thin Java client 210. The thin Java client can be downloaded by a client and used to invoke a Web Service, such as from a JDK 1.3 Virtual Machine. This can be accomplished using a client generation Ant task. A Web service EAR can be packaged and deployed on the application server 212.

A service generation master task can be used to perform many of these steps using task configuration parameters. This can be useful for simple Web services. More complex Web services may require more specific tasks, or at least manual configuration and packaging.

Backend components that can be used to implement a Web service can include stateless EJBs, JMS message consumers/producers, and Java classes. JMS message consumers and producers may not have methods that can be directly associated with operations. Therefore, an object-like pseudo-interface to JMS destinations can be defined. This interface can include 'send' and 'receive' methods for sending and receiving messages from a Web service to a JMS destination. The payload of these messages can be any data type supported by a Web service runtime. While in principle any JMS message consumer can implement a JMS backend component, a message-driven bean may be preferable for some embodiments.

Certain Java types can be mapped directly to SOAP specified types. The conversion of these Java types can be handled natively by the Web service runtime. These Java types do not require the application to specify an XML representation, nor do they require any serializers or deserializers. These Java types are defined in JAX-RPC:

primitive types: boolean, byte, short, int, long, float, double
primitive wrapper classes in java.lang: Boolean, Byte, Short, Integer, Long, Float, Double
java.lang.String
java.util.Date
java.util.Calendar
java.math.Biginteger
java.math.BigDecimal
Arrays of these Applications can use data types other than those that are built-in. To avoid the need for manually defining serializers and XML schemas for every non-built-in type, an Autotyper Ant task can be provided that can generate Java or XML representations, serializer/deserializer classes, and type mappings for most data types used in applications. A command-line version of the Ant task can also be used.

An autotyping task can ensure that for every complex type, the following is available:

XML representation of the types (in XML Schema notation)
Java representation of the types
Serializer/Deserializer classes to convert between Java and XML representations
Type mappings to associate the XML and Java types with the appropriate serializer/deserializer classes.

There can be two modes for an Autotype Ant task, which can differ in the input they accept. These modes can include:

Java mode: start with Java representation of types and generate an XML Schema representation plus serialization classes and type mappings. Typically Java mode is used when implementing a Web service.

XML mode: start with an XML representation, such as from a WSDL service description, and generate a Java representation plus serialization classes and type mappings. XML mode can be used when implementing client access to a remote Web service for which there is a WSDL description.

Table 1 shows possible autotype task parameters.

TABLE 1

Autotype task parameters

| Attribute | Description | Required |
|---|---|---|
| ejbJar | The ejb-jar file containing the backend EJBs. If ejbJar is specified, the task runs in Java mode. | Yes, unless javaClasses or wsdl is specified |
| javaClass Components | A comma-separated list of Java class Web service implementations. If | Yes, unless wsdl or ejbJar is specified. |

TABLE 1-continued

Autotype task parameters

| Attribute | Description | Required |
|---|---|---|
| | javaClassComponents is specified, the task runs in Java mode. | |
| wsdl | The file path or URL for a WSDL file containing schema definitions of types. If wsdl is specified, task runs in WSDL mode. | Yes, unless javaClassComponents or ejbJar is specified. |
| includeEjbs | A comma-separated list of ejb-names for EJBs that should have types generated. | No. May not be specified unless ejbJar is also specified. |
| excludeEjbs | A comma separated list of ejb-names for EJBs that should not have types generated. | No. May not be specified unless ejbJar is also specified. |
| serviceName | The name of the service in the Web service deployment descriptor of the service with which the types are to be associated. Default is a service named "newService". | No. |
| destWar | Output a type information suitable for inclusion in a Web service deployment WAR. The value of destWar should be a WAR file or exploded WAR directory into which to write the deployment descriptor, serializers, type descriptions. | Yes. |
| overwrite | Overwrite the contents of the destination WAR, specifically the serializer classes and deployment descriptor. If not, then a merge of deployment descriptors and WAR contents will be attempted. True or False; default is True. | No. |
| expand Methods | Whether to explicitly write out separate operations and parameters for each method of the components, or to use the implicit definitions (e.g., method="*"). True or False, default is False. | No. |

An example of an autotype task parameter for Java is as follows:

```
<autotype ejbJar="myejb.jar"
    destWar="myWebservice.war"
    overwrite="True"
/>
```

The above example generates typing information for non-built-in data types in EJB interfaces in all ejbs in myejb.jar, and writes the serializers and deployment descriptors into mywebservice.war. If there is a deployment descriptor in mywebservice.war, it is overwritten.

```
<autotype JavaClasses"test.MyService,test.MyOtherService"
    destWar="myWebservice.war"
        overwrite="True".
    />
```

The above example generates typing information for the two classes, test.MyService and test.MyOtherService. If there is a deployment descriptor in mywebservice.war, it is overwritten.

In some cases, the application data types may be too complex for an autotyper to understand. In other situations, the application developer may wish to have control over the parts of a Java class that are serialized, as well as control over how it will be done. Under these circumstances, a developer can choose to implement custom types manually. To do this, the developer can:

Write an XML Schema definition of the XML representation of that type.

Write a Java class that represents the type in Java.

Write a serializer class that implements the interface Webservice.core.encoding.soap.SOAPSerializer.

Write a deserializer class that implements the interface Webservice.core.encoding.soap.SOAPDeserializer.

Enter the type information into the deployment descriptor: the XML Schema definition under the <xml-type-defs> element; the Java class type definition and the serializer, deserializer class names under the <type-mapping> element. Apply the type mappings to operations of the Web service using the <operation> and/or <operation-set> elements.

An Autotyper can perform these steps automatically. Therefore, another entirely valid approach to developing custom types is to run the Autotyper and then customize the resulting generated schemas and classes.

Under normal circumstances, the implementation of a Web service can consist of the backend components and possibly some custom data types. This model can ensure the separation of the business logic of the application, encapsulated in the backend components and types, from the details of the messaging infrastructure (i.e., SOAP, HTTP). There can be some applications, however, that may need to access to the message level, such as to read or write SOAP headers. To support these applications, a handler can be provided that is a type of interceptor. Handlers can provide complete access to the SOAP and HTTP requests and responses. They can be invoked in the sequence of processing a SOAP message.

A handler can implement a Web service handler interface. The handler can read or write the SOAP request or response. The handler can also access information about the request processing, such as may include error status and MIME headers.

Flow handlers can be registered in the deployment descriptor as part of a flow. The flow can consist of a series of inbound flow handlers, followed by an invoke of a backend component, followed by outbound flow handlers.

An additional capability that can be utilized is the ability to automatically generate a Web service "home page". This is a Web page that can be deployed along with the Web service, which can allow a browser client to:

access the service WSDL download a client runtime (either SSL and non-SSL versions, depending on the protocol)

downloadable client jar use a service test page

The home page can be generated automatically when the service endpoint URL is dereferenced by a browser. The output can be computed based on the content of the deployment descriptor and the interfaces of the backend components.

A thin client can be provided for accessing a Web service from a Java Virtual Machine, such as a JDK 1.3 virtual machine. A complete thin client for a Web service can consist of two jars: a client runtime jar and a service-specific jar.

A client runtime jar can be independent of any specific Web service. This jar can contain those classes needed to support the client side of a Web service runtime. The contents of this jar can be included in Weblogic.jar, so clients that are server components do not need to include this jar in order to access remote Web services.

A service-specific client jar can be specific to a particular Web service. This jar can be generated by a client generation ant task. This jar can be required for static API access to a remote Web service, regardless of whether the client is a server-side component or in a standalone Java virtual machine. Task parameters for a client generation ant task are shown in Table 2.

TABLE 2 client generation Ant task parameters

| Attribute | Description | Required |
|---|---|---|
| sdl | The file path or URL for a source WSDL file containing a remote service | Yes, unless ear is specified |
| ear | The source EAR jar file or exploded directory containing the Web services from which the client should be generated | Yes, unless wsdl is specified |
| warName | The name of the Web service war file in the ear. This option is not allowed unless ear is specified. Default is Webservice.war. | No. |
| serviceName | The name of the service (either from the <Web-service> element in the deployment descriptor for an EAR source, or from the <service> element in a WSDL source) for which a client should be generated. If omitted, the client will be generated for the first service found in WSDL or the EAR deployment descriptor. | No. |
| typeMappings | A file of type mappings to use in generating the stubs. If generating a client from an ear, this will override the type mappings in the Web service deployment descriptor inside the Web service war. | No. |
| packageName | The Java package into which the client interfaces, stubs should be placed. | Yes |
| autotype | Whether to generate Java or XML types and serializer/deserializer classes for the non-built in data types. True or False; default is True. | No |
| clientJar | Pathname of the output client jar (file or exploded jar directory) into which the client interfaces, stubs will be put. | Yes |
| overwrite | Overwrite any existing clientJar. True or False; default is True. | No |
| default Endpoint | What the default endpoint for the service should be if the stub is instantiated with its default constructor. If ommitted, the default endpoint will be http://localhost:7001/<warname>/ws/<serviceURI>. | No |

An example of a client generation ant task is given by the following:

```
<clientgen
    ear="session.ear"
    warName="session.war"
    packageName="test"
    clientJar="session-client.jar"
/>
```

The above example creates a session-client.jar which contains stubs for statically invoking the first service in session.war.

```
<clientgen
    wsdl="http://www.xmethods.net/sd/2001/
        CATrafficService.wsdl"
    packageName="test.traffic"
    clientJar="traffic.jar"
/>
```

The above example creates a client jar for the services which are described in CATrafficService.wsdl. The client interfaces and stubs are generated in the test.traffic package and put into the jar file traffic.jar.

A deployable Web service can be contained solely in an EAR file with components such as EJB jars containing the EJB implementation of the Web services. Other components can include Web service WAR files containing the Web service configuration, typing resources, and entry point.

A Web service WAR is a Web archive file, which can include a Web service deployment descriptor in Web-INF/Web-services.xml. The WAR can also include serializers and deserializers that support non-built-in data types. The compiled java classes can be written into Web-INF/classes. The WAR can also include a service home page JSP.

Ant tasks can include a built-in EAR task to facilitate building EAR files. Table 3 shows a summary of an EAR file structure.

TABLE 3

EAR file structure

| <Webservices.war> | /Web-INF/Web-services.xml | Web Service Deployment Descriptor |
|---|---|---|
| | /Web-INF/classes | Serializers, Deserializers, Flow Handlers for Web services and dependent classes for these |
| | /<service_name>_client.jar | Downloadable Java client jar (one per service) |
| <ejb.jar> | | EJBs implementing the Webservice | where
<service_name> is the service name as defined in the <Web-service> element of the deployment descriptor.
<Webservices.war> is the name of the WAR file directory containing the Web services
<ejb.jar> is the name of the ejb-jar directory containing the backend EJB components A Web service WAR does not have to contain a Web.xml deployment descriptor, although it may include one if regular Web-applications are to be configured to go along with the Web service. There can also be multiple Webservice WARs and EJB-JARs in an EAR.

A single master Ant task can be supported to perform the steps needed to develop a Web service in an automated fashion. This task can be useful for Web services which are very run-of-the-mill, with few specific options needing to be set. A service generation Ant task, such as "servicegen", can be the master task used to build Web services for deployment. Parameters that can be useful with a service generation Ant task are shown in Table 4.

TABLE 4

Service generation Ant task

| Name | Type | Description | Required |
|---|---|---|---|
| destEar | Attribute | The EAR file or exploded directory into which the Web service will be written, If the file/dir does not exist and the name ends in ".ear", a new EAR file will be created; otherwise an exploded EAR directory will be created. | Yes |
| overwrite | Attribute | Whether to overwrite components of the Web service in the destination ear (e.g., deployment descriptor). "True" or "False"; default is "True". | No |
| warName | Attribute | Name of the Web service war into which the service(s) will be written. If the destEar is exploded, this will be written to an exploded war directory in the exploded ear (with any .war prefix in the name omitted). Default is Web-services.war. | No. |
| service | Element (1 or more) | Description of Web services to be assembled. | Yes. |

A service element can be used to build a Web service from ejb-jars or java classes. The EJBs or classes can be introspected, deployment descriptors constructed, and automatic typing performed. Optionally, a home page and client can be generated. Parameters that can be useful with a service Ant task are shown in Table 5.

TABLE 5

Service Ant task

| Name | Type | Description | Required |
|---|---|---|---|
| ejbJar | Attribute | The jar file containing the backend EJB component. This is either a jar file name, or an exploded jar directory. | Yes, unless javaClass Components is specified |
| javaClass Components | Attribute | A comma-separated list of Java class Web service implementations. | Yes, unless ejbJar is specified. |
| includeEJBs | Attribute | A comma-separated list of ejb-names for EJBs that should have types generated. | No. May not be specified unless ejbJar is also specified. |
| excludeEJBs | Attribute | A comma-separated list of ejb-names for EJBs that should not have types generated. | No. May not be specified unless ejbJar is also specified. |
| serviceName | Attribute | The name of the service in the WSDL and deployment descriptor. | Yes. |
| serviceURI | Attribute | The URI component of the URL used by clients to access the Web service. The Web service endpoint will be of the form <protocol>://<host>:<port>/<destWarName>/ws/<serviceURI>> | Yes. |
| target Namespace | Attribute | The target namespace URI of the service. | Yes. |
| protocol | Attribute | Protocol over which this service is deployed. "http" or "https"; "http" is the default. | No. |
| expand Methods | Attribute | Whether to explicitly write out separate operations and parameters for each method of the components, or to use the implicit definitions (e.g., method="*"). True or False, default is False. | No |
| generateTypes | Attribute | Whether to perform autotyping to generate types and serializers for Java classes that do not map to built-in types. True or False; default is True. | No |
| client | Element (0 or 1) | Specify that a client should be generated and included in the EAR. This is necessary if the service home page will allow a client jar to be downloaded. | No |

A client element can be specified in service. If the client element is specified, a client jar can be generated and put into the EAR. This client jar cn be accessible from the service home page so that it can be downloaded by remote clients. This element can be used to specify parameters for the generation of the client. Table 6 shows possible types for a client element.

TABLE 6

Client element types

| Name | Type | Description | Required |
|---|---|---|---|
| packageName | Attribute | The Java package into which the client interfaces, stubs should be placed. | No |
| clientJar | Attribute | Name of the client jar. It will be placed into the top level directory of the Web service war in the ear. | Yes. |
| defaultEndpoint | Attribute | What the default endpoint for the service should be if the stub is instAntiated with its default constructor. If ommitted, the default endpoint will be http://localhost: | No |

TABLE 6-continued

Client element types

| Name | Type | Description | Required |
|------|------|-------------|----------|
|      |      | 7001/<warname>/ws/<serviceURI>. |  |

Example

```
<servicegen destEar="c:/myapps/myapp.ear">
  <service ejbJar="c:/dev/myaps/myejb.jar"excludeEJBs=
     "badejb, awfulejb"
  />
```

Ant tasks that can be provided to support Web services are shown in the Table 7.

TABLE 7

Ant tasks

| Task | Purpose | Input | Output |
|------|---------|-------|--------|
| servicegen | Master task to generate a deployable service. Calls Autotyper, HomePageGen, ClientGen tasks. | EJBs optional: deployment descriptor | deployable EAR |
| wsgen | A task to facilitate migrating between versions of Web services | EJBs | deployable EAR |
| autotype | Generate default typing for complex types in the service implementation | EJB-JARs or classnames optional: WAR | Deployment descriptor serializer classes |
| clientgen | Generate a client jar and sample code to invoke a Web service |  |  |

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for deploying a web service, comprising:
a backend component for implementing a web service, the operation of the web service being mapped to methods of the backend component;
a registered inbound interceptor adapted to process an inbound message before the backend component and a registered outbound interceptor adapted to process an outbound message after the backend component;
a codec for converting data in the inbound message and the outbound message between Extensible Markup Language (XML) representations and objects for use with said backend component;
an autotyper for generating an additional codec, the additional codec converting additional data types from XML representation to JAVA objects; and
wherein the backend component, the registered inbound and the registered outbound interceptors, the codec and the autotyper are contained within a web service container; and
wherein the system includes at least one processor.

2. A system according to claim 1, further comprising a Java Message Service (JMS) connection factory for using JMS with the web service.

3. A system according to claim 1, wherein said backend component is selected from the group consisting of beans, JMS message consumers, JMS message producers, and classes.

4. A system according to claim 1, further comprising a container driver to interact with the registered interceptors and the backend component.

5. A system according to claim 1, further comprising a web service home page for describing the web service.

6. A system according to claim 1, further comprising a thin client for accessing the web service from a virtual machine.

7. A method for deploying a web service, comprising:
deploying a backend component for implementing the web service;
providing access to SOAP contents of web service messages using a registered inbound interceptor adapted to process an inbound message before the backend component and a registered outbound interceptor adapted to process an outbound message after the backend component;
providing a codec for converting data in the web service invocation message from an XML representation to an object for use with the backend component implementing the web service;
an autotyper for generating an additional codec, the additional codec converting additional data types from XML representation to objects; and
wherein the backend component, the registered inbound and the registered outbound interceptors, the codec and the autotyper are contained within a web service container; and
wherein the generation of the additional codec is done using at least one processor.

8. A method according to claim 7, further comprising:
mapping the operation of the web service mapped to methods of the backend component.

9. A method according to claim 7, further comprising:
reading the web service messages with the interceptor and passing the contents of the message to the backend component.

10. A method according to claim 7, further comprising:
receiving response data from the backend component and writing SOAP contents to a web service response message using the interceptor.

11. A method according to claim 10, further comprising:
providing a codec for converting data in the web service response message from a object to an XML representation.

12. A method according to claim 7, further comprising:
implementing data types for the web service.

13. A method according to claim 7, further comprising:
using a SOAP message processor to process SOAP information not encoded in the backend component.

14. A method according to claim 7, further comprising:
editing a web service deployment descriptor to activate the web service.

15. A method according to claim 7, further comprising:
generating a web service home page to describe the web service.

16. A method according to claim 7, further comprising:
generating a client for accessing the web service from a virtual machine.

17. A method according to claim 16, further comprising:
generating a client jar to contain the client.

18. A method according to claim 7, further comprising:
packaging and deploying a web service archive file.

19. A system for deploying a web service, comprising:
means for deploying a backend component for implementing the web service;
means for providing access to SOAP contents of web service messages using a registered inbound interceptor adapted to process an inbound message before the backend component and a registered outbound interceptor adapted to process an outbound message after the backend component;
means for providing a codec for converting data in the web service messages from an XML representation to an object for use with the backend component implementing the web service;
an autotyper that can generate an additional codec, the additional codec converting additional data types from XML representation to objects; and
wherein the backend component, the registered inbound and the registered outbound interceptors, the codec and the autotyper are contained within a web service container; and
wherein the system includes at least one processor.

20. A computer system comprising: a processor;
object code executed by said processor, said object code configured to:
deploy a backend component for implementing the web service;
provide access to SOAP contents of web service messages using a registered inbound interceptor adapted to process an inbound message before the backend component and a registered outbound interceptor adapted to process an outbound message after the backend component;
provide a codec for converting data in the web service messages from an XML representation to an object for use with the backend component implementing the web service;
an autotyper that can generate an additional codec, the additional codec converting additional data types from XML representation to objects; and
wherein the backend component, the registered inbound and the registered outbound interceptors, the codec and the autotyper are contained within a web service container.

21. A computer readable storage medium containing code comprising:
a code segment including instructions to deploy a backend component for implementing the web service;
a code segment including instructions to provide access to SOAP contents of web service messages using a registered inbound interceptor adapted to process an inbound message before the backend component and a registered outbound interceptor adapted to process an outbound message after the backend component;
a code segment including instructions to provide a codec for converting data in the web service messages from an XML representation to an object for use with the backend component implementing the web service;
an autotyper that can generate an additional codec, the additional codec converting additional data types from XML representation to objects; and
wherein the backend component, the registered inbound and the registered outbound interceptors, the codec and the autotyper are contained within a web service container.

* * * * *

UNITED STATES PATENT AND TRADEMARK OFFICE
CERTIFICATE OF CORRECTION

| | | |
|---|---|---|
| PATENT NO. | : 7,693,955 B2 | Page 1 of 1 |
| APPLICATION NO. | : 10/366246 | |
| DATED | : April 6, 2010 | |
| INVENTOR(S) | : Todd Karakashian | |

It is certified that error appears in the above-identified patent and that said Letters Patent is hereby corrected as shown below:

In column 2, line 17, delete "An" and insert -- A --, therefor.

In column 2, line 55, after "120" insert -- . --.

In column 5, line 63, delete "<autotype JavaClasses"test.MyService,test.MyOtherService"" and insert -- <autotype JavaClasses="test.MyService,test.MyOtherService" --, therefor.

In column 7, line 22, delete "sdl" and insert -- wsdl --, therefor.

In column 9, line 8, delete "written," and insert -- written. --, therefor.

In column 10, line 36, delete "cn" and insert -- can --, therefor.

In column 12, line 3, in Claim 1, after "to" delete "JAVA".

In column 12, line 58, in Claim 11, delete "a object" and insert -- an object --, therefor.

Signed and Sealed this
Twenty-second Day of February, 2011

David J. Kappos
*Director of the United States Patent and Trademark Office*